US008562296B2

(12) United States Patent
Arocena De La Rua et al.

(10) Patent No.: US 8,562,296 B2
(45) Date of Patent: Oct. 22, 2013

(54) LIGHTNING PROTECTION SYSTEM FOR SECTIONAL BLADES

(75) Inventors: Ion Arocena De La Rua, Sarriguren (ES); Anna Candela Garolera, Sarriguren (ES); Eneko Sanz Pascual, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 779 days.

(21) Appl. No.: 12/763,336

(22) Filed: Apr. 20, 2010

(65) Prior Publication Data
US 2010/0272570 A1    Oct. 28, 2010

(30) Foreign Application Priority Data
Apr. 22, 2009    (ES) .................................. 200901053

(51) Int. Cl.
*F03D 11/00*    (2006.01)
(52) U.S. Cl.
USPC ................... 416/146 R; 416/229 R; 416/224; 416/226; 416/232; 416/233; 416/241 R; 415/4.3; 415/4.5; 415/900
(58) Field of Classification Search
USPC ............ 415/4.3, 4.5, 900; 416/146 R, 229 R, 416/226, 224, 232, 233, 241 R; 290/44, 55
See application file for complete search history.

(56) References Cited

U.S. PATENT DOCUMENTS

| 6,612,810 | B1 * | 9/2003 | Olsen et al. ...................... 416/95 |
| 7,186,086 | B2 * | 3/2007 | Yoshida .................... 416/146 R |
| 7,891,947 | B2 * | 2/2011 | Chen et al. ..................... 416/225 |
| 7,922,454 | B1 * | 4/2011 | Riddell ......................... 416/224 |
| 8,142,157 | B2 * | 3/2012 | Kita et al. ................. 416/146 R |
| 2003/0138290 | A1 | 7/2003 | Wobben |

FOREIGN PATENT DOCUMENTS

| DE | 31 09 566 A1 | 10/1982 |
| DE | 44 36 197 A1 | 4/1996 |
| EP | 0 707 145 A1 | 4/1996 |
| EP | 1 584 817 A1 | 10/2005 |
| EP | 2 019 204 A1 | 1/2009 |
| ES | 2 255 436 A1 | 6/2006 |
| ES | 2 255 454 A1 | 6/2006 |
| ES | 2 265 760 A1 | 2/2007 |
| WO | 96/07825 A1 | 3/1996 |
| WO | 01/77527 A1 | 10/2001 |

OTHER PUBLICATIONS espacenet English abstract of DE 44 36 197 A1, Apr. 1996.
espacenet English abstract of EP 0 707 145 A1, Apr. 1996.
espacenet English abstract of ES 2 255 436 A1, Jun. 2006.
espacenet English abstract of ES 2 255 454 A1, Jun. 2006.
espacenet English abstract of ES 2 265 760 A1, Feb. 2007.
espacenet English abstract of DE 31 09 566 A1, Oct. 1982.

* cited by examiner

*Primary Examiner* — Igor Kershteyn
(74) *Attorney, Agent, or Firm* — Ladas & Parry LLP

(57) ABSTRACT

Additional lightning protection system for intermediate wind turbine blade joints comprises a metal fairing that covers the blade connector elements while shielding and protecting the internal connector elements from getting hit by lightning.

8 Claims, 4 Drawing Sheets

LIGHTNING PROTECTION SYSTEM FOR SECTIONAL BLADES

OBJECT OF THE INVENTION

This invention is associated with the lightning protection systems implemented in the blades of the wind turbines and, more specifically, with a lightning protection system for sectional blades.

BACKGROUND OF THE INVENTION

The blade is the component of a wind turbine that is most vulnerable to being hit by lightning. Numerous factors make the design of an adequate system that prevents damage from getting hit by lightning complex: its great length, the combination of non-conductive materials (such as fiberglass) with other conductive ones (such as carbon fiber), low resistance to the heat of the resins utilized, etc . . .

The need to equipotentialize all of the conductive elements of the blade and connect them to the lightning arrester system for the rest of the wind turbine is covered in the existing bibliography on lightning strikes.

Carbon fiber, as a conductive material, must be equipotentialized with the lightning arrest system. The problem with leaving conductive materials isolated is the very elevated difference in power that is created between them due to the induction phenomena originated by the lightning bolt while it passes through the lightning arrest system. This difference in power can give way to skipping the arc, which would be a fatal situation for the fiber laminate of the blade.

Most blade designs include a lightning protection system that consists of a series of receptors placed in the area closest to the tip of the blade, that are joined by a cable that descends through the interior of the blade to a system that is located in the hub of the wind turbine, which guides the lightning bolt to its base. The system must make it such that the impact of the lightning bolts is attracted to the receptors, in order to prevent them from hitting other more exposed parts of the blade. Once the lightning is captured, the system must make it such that the lightning is guided to the base of the blade without its great energy causing damages to the structure of the blade.

Different solutions are known based on this kind of typology. They are shown in patents like DE4436197, WO0177527, U.S. Pat. No. 6,612,810, WO9607825, EP0707145 or the applicant's patents ES2255436 and ES2255454.

On the other hand, the large size reached in the latest blade designs is causing the designs to be carried out where the blade is divided into several sections that are assembled on the site of the wind turbine. In this manner, the logistics and transport of the machine assembly is simplified and sites where it is not viable to transport large blades can be accessed.

There can be two kinds of blade joint systems: chemical joints (through adhesive means) or mechanical joints (through bolting solutions). Given how sensitive adhesive joints are to environmental conditions, the joints of blades based on bolting systems are more robust and appropriate for on field assembly.

Patents EP 1 584 817 and ES 2 265 760 from the applicant show two sectional blade solutions whose mechanical joints are done with bolting solutions.

There are other known sectional blade solutions whose sections are joined mechanically through bolted unions like those shown in patents US20030138290 and DE3109566.

Therefore, the inclusion of bolted joints between blade sections is achieved through the inclusion of metal elements in the blade joint.

These metal elements directly affect the behavior of the blade when faced with lightning strikes, given that they become potential lightning strike attraction points, and therefore must be considered in the design of the lightning strike blade protection system, given that the impact of lightning bolts on the bolted joint could damage it (generate points where cracks could start, damage to threaded joints, damages to possible monitoring systems, jumps of arcs between different metal elements, etc . . . )

A basic protection solution shall consist of connecting the metal elements to the blade's grounding line, but connecting them to the ground makes them more susceptible to a lightning strike. Not connecting these metal elements to the grounding cable reduces risk, but it must be taken into account that, if a lightning strike were to occur, the current could only be passed on to the grounding cable through an electric arc, with subsequent damage to the joint.

There are also known lightning strike protection system solutions like European Patent EP 2 019 204, which proposes the placement of a receptor, like a clamp, on the outer surface of the blade's composite material (embedded in the laminate or placed afterwards on top of the composite). This solution behaves in the same manner as a typical tip receptor, with only the form of the receptor changing, having a larger surface than typical receptors. However, these solutions, because they are on the surface of the shell, do not solve the problem of lightning strikes on the connectors of the blade sections, given that the placing of receptors like the one shown on the side of the blade joint would not eliminate the possibility of strikes to the metal elements of the blade joint.

DESCRIPTION OF THE INVENTION

This invention consists of a lightning protection system for intermediate wind turbine blade joints comprising a metal fairing that covers the blade connector elements, maintaining the aerodynamic geometry of the blade section while protecting the internal connector elements from getting hit by lightning.

This invention applies to a blade that comprises several modules that are connected with each other through a bolted joint and that has a lightning strike protection system comprised of a receptor on one end of the blade and a grounding cable that extends throughout the length of the structural beam of the blade.

Once the structural joint between the blade modules is completed, said joint is covered with a series of metal fairings, which achieve a continuity in the surface on the outside of the blade, shielding the volume contained by the fairings where the metal elements of the joint are located, meaning, they create an enclosure where the existing electric field is null. This phenomenon makes it such that when the blade is exposed to the intense electric field generated before the impact of the lightning bolt there are no vertical discharges of the blade joint elements and that there are some from the metal fairings, thereby guaranteeing that the impact shall occur on the fairings before they occur on the metal elements of the blade. This way, the joint elements are insulated from the impact of lightning bolts.

Once the blade joint elements are protected from direct impact, there is the option to connect or not to connect the elements to the grounding cable in order to resolve other phenomena (eddy currents in the elements, static electricity discharge, etc . . . ).

Securing the fairings to the blade modules is done through bolted joints.

On the other hand, the fairings are connected to the grounding cable of the lightning protection system, thereby becoming an additional receptor for the lightning arrest system.

The joint of the fairings to the grounding cable can be done:
1. In a direct manner; bolting an auxiliary cable to the fairings and the grounding cable
2. Indirectly; installing some auxiliary conductive elements, metal profiles, in the outer areas of the blade modules where the fairings are bolted, connected to the grounding cable. This way, upon placing the metal fairing on the profiles, the entire set of fairings is connected electrically to the grounding cable.

The connection of the grounding cables for each module is done by bolting a fitting to each module, on one of the sides of the beam, before placing the fairings.

Lastly, an added advantage of the proposed design is the easy substitution of the fairings if they are hit by a lightning or the easy inspection of the condition of the intermediate joint through the disassembly of the fairings that are located over the joint.

DESCRIPTION OF THE PREFERENTIAL EXECUTION

The blades of large dimension wind turbines have modular designs, meaning that they are made up of different sections that are connected to each other through mechanical joints, like bolted joints, which incorporate a large quantity of metal elements into the intermediate sections of the blade, which constitute a potential impact point for lightning bolts.

Figure 1:
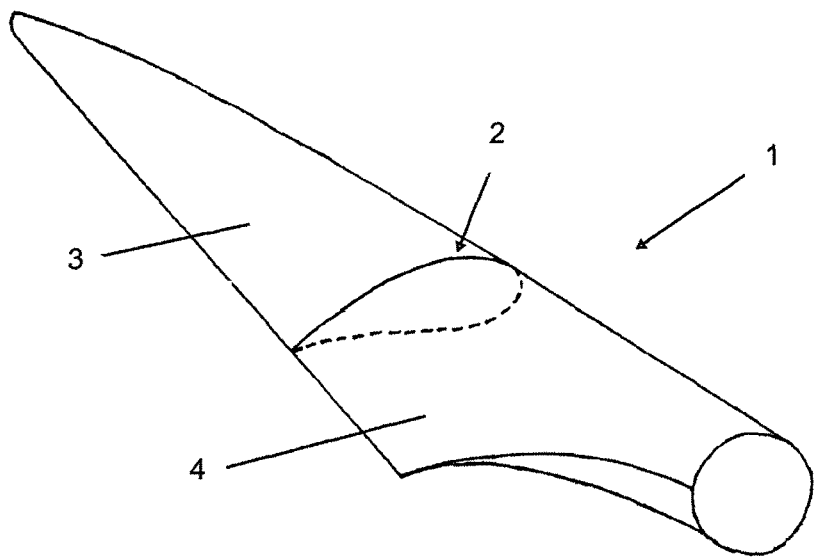
FIG. 1 shows a perspective of a sectional blade.
Figure 2:
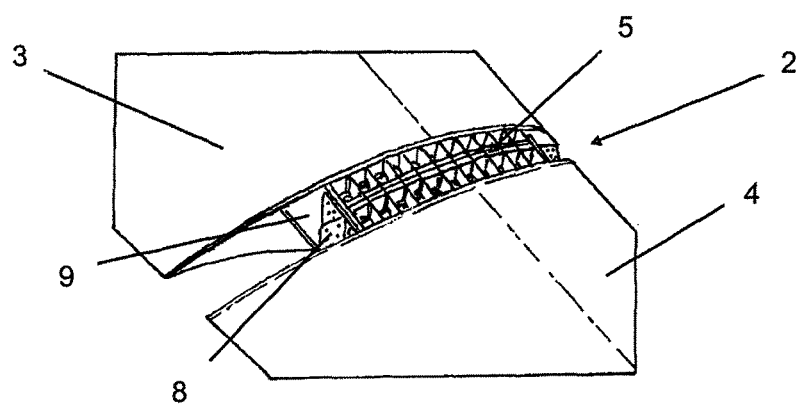
FIG. 2 shows a detail of the portion of the joint of the blade done with bolted joints.

FIG. 1 shows a sectional blade (1) with this characteristics, comprised by a module I (3) and a module II (4), connected to each other through a series of metal elements (5) like the ones shown in FIG. 2.

Generally, lightning protection systems base their typology on the placement of a receptor on the end that is furthest away from the wind turbine, meaning on the blade tip, and which is connected to a grounding cable that extends lengthwise over the blade beam to a grounding point.

However, as has been previously indicated, these solutions do not protect the joint parts of the blades that are comprised of several modules, and therefore this invention proposes an addition lightning protection system, which would apply to said joint areas (2) of the different modules (3,4) that make up a sectional blade (1).

Figure 3:
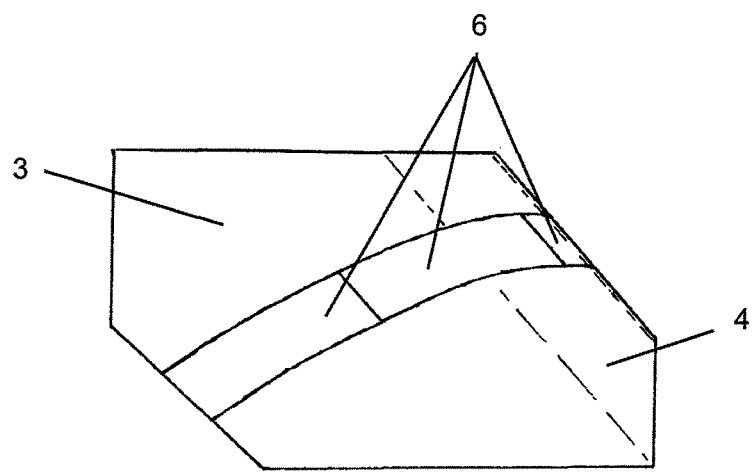
FIG. 3 shows a detail of the portion of the joint of two blade modules with some of the fairings placed according to the invention.

The additional protection system, as is shown in FIG. 3, is based on the incorporation of some fairings (6), at least two of which are metal, preferably opposite of each other for each shell, on the joint portions (2), in such a way that they are integrated into the structure of the blade itself (1), leaving a smooth surface and thereby preventing aerodynamic problems that could cause noises and could cause a reduction in aerodynamic performance.

The incorporation of metal fairings (6) placed in such a manner that they shield the blade joint so that the electrical field (5) is annulled in the joint area (2) thereby preventing the impact of lightning bolts on the elements of the joint. In case the lightning bolt impacts the fairings (6), this is discharged to the grounding cable (7) and from there, it is sent to the ground, such that the current does not circulate through the joint elements (2). On the other hand, if the impact is on the receptor of the main protection system, the current shall be discharged through the grounding cable (7) until it reaches the ground, without circulating through the fairing (6) or through the metal elements (5) of the joint (2).

The connection of the fairings (6) to the grounding cable (7) of the main lightning protection system can be done directly or indirectly.

Figure 4:
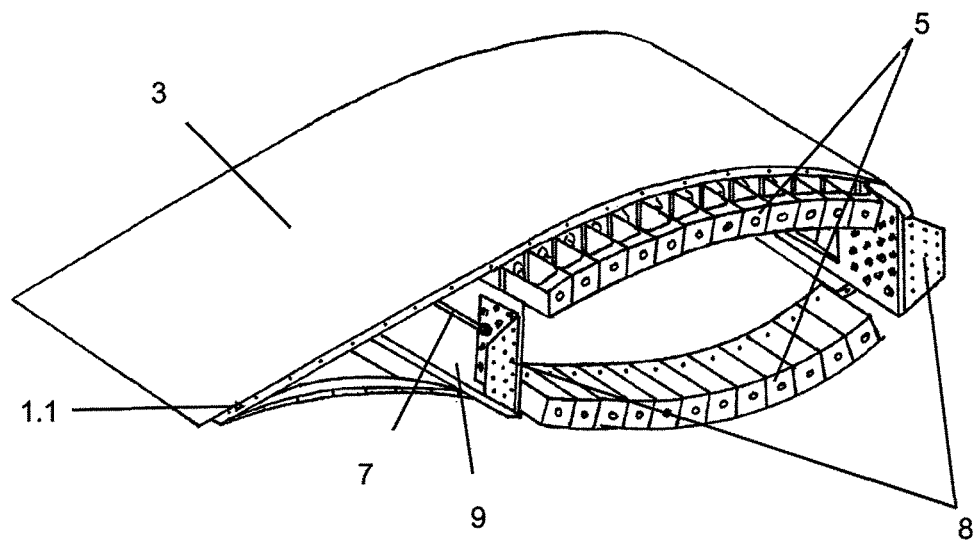
FIG. 4 shows a perspective view detail of the coupling of the grounding cable to a fixture placed in the structural beam of a blade module.
Figure 5:
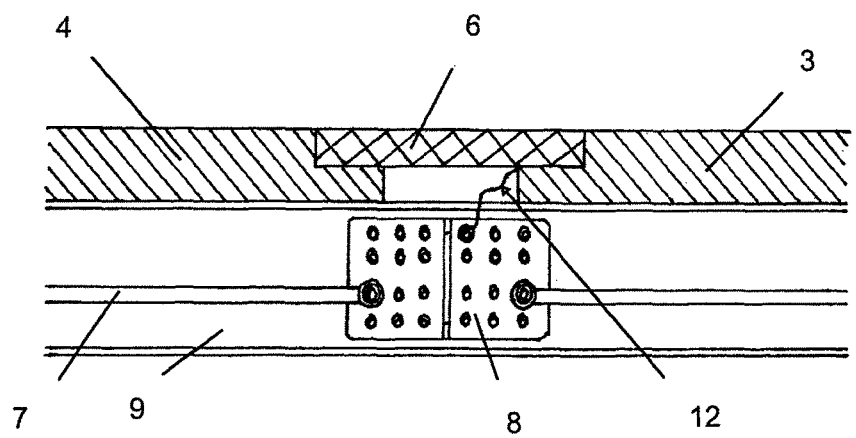
FIG. 5 shows a detail of the section of the portion of the joint between the blade modules for a direct connection of the fairings according to the invention.

The direct connection (see FIG. 5) incorporates an additional cable in order to connect it through the fixture (8) that is on the structural beam (9) of the blade (1), which the grounding cable (7) (see FIG. 4) and the metal fairings (6) that cover the blade (1) module (3 and 4) joints (2) are connected to.

Figure 6:
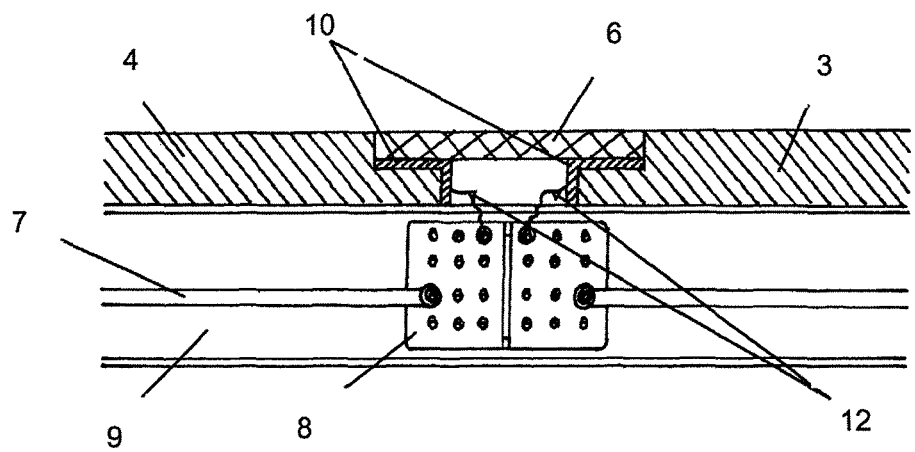
FIG. 6 shows a detail of the section of the portion of the joint between the blade modules for an indirect connection of the fairings according to the invention.
Figure 7:
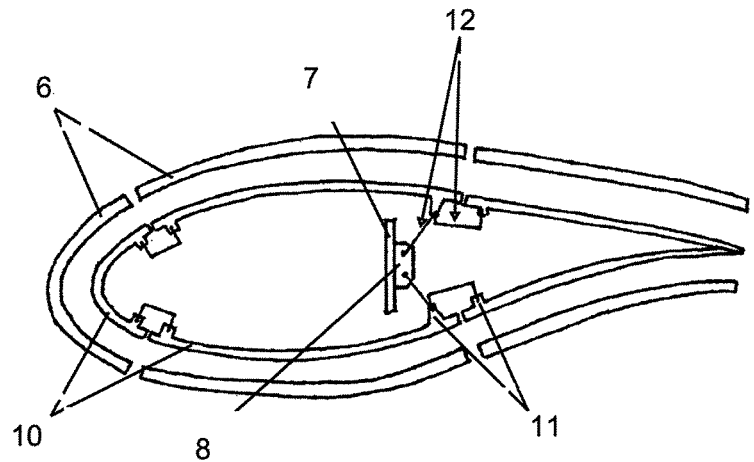
FIG. 7 shows an exploded view of the placement of the fairings over the profiles on the portion of the blade module joint according to the invention.
Figure 8:
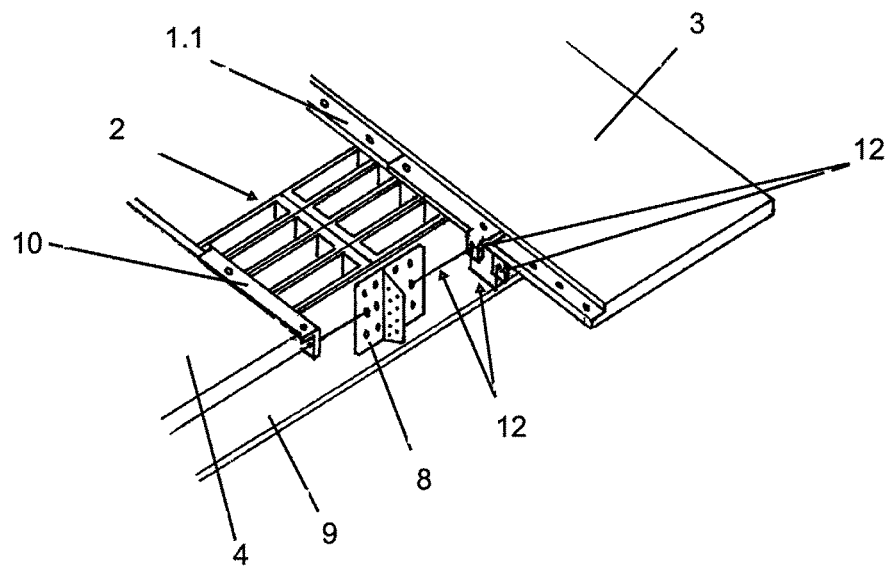
FIG. 8 shows a schematic detail of the connection between the profiles and the grounding cable according to the invention.

The indirect connection, as shown in FIGS. 6, 7, and 8, incorporates some profiles (10) that require some connection tabs (11) and that are placed over the edges (1.1) of the ends of the blade (1) modules (3 and 4). The fairings (6) are bolted over said profiles (10) which have been connected to each other beforehand through additional cables (12) and to the fairing (8) located on the side wall of the blade's (1) structural beam (9) that the grounding cable is connected to (7).

The invention claimed is:

1. A lightning protection system for sectional blades, the kind that is incorporated in addition to a main lightning protection system that comprises a receptor and a grounding cable, in order to protect a metal joint of a blade formed by different modules, wherein it incorporates some fairings, at least two of which are metal, that are leveled with some shells of the blade thereby keeping the aerodynamic geometry on the metal joint portion between the blade modules connected to the grounding cable of the main lightning protection system, shielding a volume where some blade joint elements are contained.

2. Lightning protection system for sectional blades according to claim 1, wherein the fairings are bolted onto some edges of some ends of the blade modules forming a blade surface that is smooth and continuous.

3. Lightning protection system for sectional blades according to claim 2, wherein the fairings are connected through an auxiliary cable to some fixtures located on side of a structural beam of the blade to which the grounding cable is connected.

4. Lightning protection system for sectional blades according to claim 1, wherein the connection of the fairings (6) incorporates some profiles that require some connection tabs and that are placed over some edges of some ends of the blade modules.

5. Lightning protection system for sectional blades according to claim 4, wherein the fairings are bolted onto the profiles.

6. Lightning protection system for sectional blades according to claim 4, wherein the profiles are connected to each other and to some fixtures located on a side of the structural beam of the blade to which the grounding cable is connected through some additional cables.

7. Lightning protection system for sectional blades according to claim 4, wherein the same number of profiles and fairings are incorporated.

8. Lightning protection system for sectional blades according to claim 1, wherein the blade joint elements are also connected to the grounding cable of the lightning protection system.

* * * * *